US012709987B2

(12) United States Patent
Wasserman et al.

(10) Patent No.: US 12,709,987 B2
(45) Date of Patent: Aug. 18, 2026

(54) CERAMIC MATRIX COMPOSITE BLADE OUTER AIR SEAL FEATHER SEAL CONFIGURATION AND METHOD

(71) Applicant: RTX Corporation, Farmington, CT (US)

(72) Inventors: David Wasserman, Hamden, CT (US); Howard Liles, Newington, CT (US); Daniel Whitney, East Waterboro, ME (US); Cheng Gao, South Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/041,609

(22) Filed: Jan. 30, 2025

(65) Prior Publication Data

US 2026/0218619 A1 Jul. 30, 2026

(51) Int. Cl.
*F01D 11/08* (2006.01)
*F01D 11/00* (2006.01)

(52) U.S. Cl.
CPC ............ *F01D 11/08* (2013.01); *F01D 11/005* (2013.01); *F05D 2240/55* (2013.01); *F05D 2260/30* (2013.01); *F05D 2300/6033* (2013.01)

(58) Field of Classification Search
CPC .... F01D 11/005; F01D 11/08; F05D 2240/55; F05D 2260/30; F05D 2300/6033
See application file for complete search history.

(56) References Cited

U.S. PATENT DOCUMENTS

| | | | | |
|---|---|---|---|---|
| 6,503,051 | B2 * | 1/2003 | Predmore | F01D 11/005 277/312 |
| 6,808,363 | B2 * | 10/2004 | Darkins, Jr. | F01D 11/005 415/173.1 |
| 6,893,214 | B2 * | 5/2005 | Alford | F01D 9/04 415/173.1 |
| 10,041,369 | B2 | 8/2018 | Blaney et al. | |
| 10,301,955 | B2 * | 5/2019 | Vetters | F16J 15/022 |
| 10,577,977 | B2 * | 3/2020 | Baucco | F01D 11/005 |
| 10,584,605 | B2 | 3/2020 | Sippel et al. | |

(Continued)

OTHER PUBLICATIONS

European Search Report dated Jun. 10, 2026 issued in corresponding application 26155527.0 (12 pages).

*Primary Examiner* — Brian P Wolcott
(74) *Attorney, Agent, or Firm* — Christopher B. Kilner; MILLEN, WHITE, ZELANO & BRANIGAN, P.C.

(57) ABSTRACT

A feather seal arrangement for a ceramic matrix composite (CMC) blade outer air seal (BOAS) of a turbine engine includes a CMC BOAS segment having a specific geometry and a first feather seal. The CMC BOAS segment includes a shoe having a flowpath side, an opposing non-flowpath side, and first and second matefaces extending axially between the flowpath side and the non-flowpath side from an upstream leading edge to a downstream trailing edge. One or more support flanges extend substantially transverse from the non-flowpath side. A geometry of the CMC BOAS segment allows a substantially flat first feather seal surface to be disposed on the non-flowpath side adjacent and substantially transverse to the first mateface. A first feather seal is disposed atop the non-flowpath side on the first feather seal surface and extends to an adjacent feather seal surface of an adjacent CMC BOAS segment.

14 Claims, 8 Drawing Sheets

(56) References Cited

U.S. PATENT DOCUMENTS

| | | | | |
|---|---|---|---|---|
| 10,704,404 | B2 | 7/2020 | Shi et al. | |
| 10,718,226 | B2 * | 7/2020 | Vetters | F01D 25/005 |
| 10,934,873 | B2 | 3/2021 | Sarawate et al. | |
| 11,078,802 | B2 * | 8/2021 | Razzell | F16J 15/106 |
| 11,111,806 | B2 * | 9/2021 | Clark | F01D 11/12 |
| 2009/0096174 | A1 * | 4/2009 | Spangler | F01D 11/08 415/173.1 |
| 2009/0110546 | A1 * | 4/2009 | Tholen | F01D 11/08 415/173.1 |
| 2020/0040755 | A1 | 2/2020 | Clark et al. | |
| 2021/0131299 | A1 | 5/2021 | Lutjen et al. | |

* cited by examiner

CERAMIC MATRIX COMPOSITE BLADE OUTER AIR SEAL FEATHER SEAL CONFIGURATION AND METHOD

FIELD OF THE INVENTION

The subject matter disclosed herein relates to providing a feather seal to a ceramic matrix composite (CMC) blade outer air seal (BOAS) and, in particular, to feather seal configurations that provide a thermal gradient reduction on segments of the CMC BOAS.

BACKGROUND OF THE INVENTION

Gas turbine engines or jet engines, in general, include a fan section, a compressor section, a combustion section, and a turbine section. Air enters through the fan section and is compressed in the compressor section before being introduced into the combustion section. In the combustion section, the air is mixed with fuel and ignited to generate a high-energy, high temperature gas flow. The high-energy, high temperature gas flow is expanded in the turbine section which is used to create thrust and to drive the compressor and fan sections.

Certain components of gas turbine engines, such as blade outer air seal (BOAS, sometimes referred to as blade shrouds), are thus exposed to the high-energy, high temperature gas flow (gas-path flow). Therefore, it is desirable that such components be made of heat-resistant materials such as ceramic matrix composites (CMCs). CMC components can withstand much higher operating temperatures than components composed of superalloys.

A CMC BOAS may be formed from multiple segments, and a feather seal may be used to seal adjacent CMC BOAS segments. However, traditional feather seal slots machined into the circumferential end faces of CMC BOAS segments can create high tensile thermal stresses.

The above information disclosed in this Background section is only for understanding of the background of the inventive concepts and, therefore, it may contain information that does not constitute prior art.

SUMMARY OF THE INVENTION

The present disclosure is directed, in a first aspect, to a feather seal arrangement for a ceramic matrix composite (CMC) blade outer air seal (BOAS) of a turbine engine. The feather seal arrangement includes a CMC BOAS segment that has a shoe with a flowpath side configured for exposure to a hot gas path of the turbine engine, an opposing non-flowpath side, and first and second matefaces extending axially between the flowpath side and the non-flowpath side from an upstream leading edge to a downstream trailing edge. The CMC BOAS segment also includes one or more support flanges extending substantially transverse from the non-flowpath side. A substantially flat first feather seal surface is disposed on the non-flowpath side adjacent and substantially transverse to the first mateface, and a first feather seal is disposed atop the non-flowpath side on the first feather seal surface and extending to an adjacent feather seal surface of an adjacent CMC BOAS segment.

In an embodiment, the arrangement may also include a first full hoop or split ring retainer configured for retaining an upstream end of the first feather seal and/or a second full hoop or split ring retainer configured for retaining a downstream end of the first feather seal.

In another embodiment, the first and/or second full hoop or slit ring retainer may include a recess configured to hold the upstream and/or downstream end of the first feather seal, respectively.

In a further embodiment of the arrangement, the one or more flanges may extend between the first and second matefaces.

In yet another embodiment of the arrangement, at least one of the one or more flanges may be set back from the first mateface to provide the first feather seal surface.

In an embodiment, at least one of the one or more flanges may include an undercut portion to provide the first feather seal surface.

In another embodiment of the arrangement, the one or more flanges may include two flanges that are set back from the first mateface, a plateau may extend from the non-flowpath side between the two flanges, and the first feather seal may be disposed on the plateau.

In a further embodiment of the arrangement, the one or more flanges may include two flanges that have a first flange set back from the first mateface, and a second flange having an undercut portion adjacent the first mateface.

In yet another embodiment, the arrangement may further include a ramp that extends between the first flange and the second flange, and the first feather seal surface may be disposed on the ramp.

The present disclosure is also directed, in a second aspect, to a feather seal method for a CMC BOAS of a turbine engine. The method includes providing a CMC BOAS segment that has a shoe with a flowpath side configured for exposure to a hot gas path of the turbine engine, an opposing non-flowpath side, and first and second matefaces extending axially between the flowpath side and the non-flowpath side from an upstream leading edge to a downstream trailing edge. The CMC BOAS segment also has one or more support flanges extending substantially transverse from the non-flowpath side, and a substantially flat first feather seal surface disposed on the non-flowpath side adjacent and substantially transverse to the first mateface. The method includes disposing a first feather seal atop the non-flowpath side on the first feather seal surface and extending the feather seal to an adjacent feather seal surface of an adjacent CMC BOAS segment.

An embodiment of the method may include disposing a first full hoop or split ring retainer to retain an upstream end of the first feather seal and/or a second full hoop or split ring retainer to retain a downstream end of the first feather seal.

Another embodiment of the method may include holding the upstream and/or downstream end of the first feather seal in a recess of the first and/or second full hoop or slit ring retainer, respectively.

A further embodiment of the method may include disposing the one or more flanges to extend between the first and second matefaces.

Yet another embodiment of the method may include setting at least one of the one or more flanges back from the first mateface to provide the first feather seal surface.

An embodiment of the method may include undercutting a portion of at least one of the one or more flanges to provide the first feather seal surface.

In an embodiment of the method, providing the one or more flanges may include providing two flanges that are setback from the first mateface, and further providing a plateau that extends from the non-flowpath side between the two flanges, and disposing the first feather seal on the plateau.

In another embodiment of the method, providing the one or more flanges may include providing two flanges including a first flange set back from the first mateface, and a second flange having an undercut portion adjacent the first mateface.

A further embodiment of the method may include providing a ramp that extends between the first flange and the second flange, and disposing the first feather seal surface on the ramp.

The present disclosure is further directed, in a third aspect, to a feather seal arrangement for a ceramic matrix composite (CMC) blade outer air seal (BOAS) of a turbine engine. In this embodiment, a CMC BOAS segment includes a shoe having a flowpath side configured for exposure to a hot gas path of the turbine engine, an opposing non-flowpath side, and first and second matefaces extending axially between the flowpath side and the non-flowpath side from an upstream leading edge to a downstream trailing edge. The CMC BOAS segment also includes a first support flange and a second support flange extending substantially transverse from the non-flowpath side, and a substantially flat first feather seal surface disposed on the non-flowpath side adjacent and substantially transverse to the first mateface and a substantially flat second feather seal surface disposed on the non-flowpath side adjacent and substantially transverse to the second mateface. A first feather seal is disposed atop the non-flowpath side on the first feather seal surface and second feather seal disposed atop the non-flowpath side on the second feather seal surface, wherein at least one of the first and second support flanges includes an undercut portion adjacent the first mateface to provide the first feather seal surface.

In an embodiment of this arrangement, the first flange may be set back from the first mateface, and the second flange may include the undercut portion adjacent the first mateface, and the CMC BOAS segment may further include a ramp that extends between the first flange and the undercut portion of the second flange, wherein the first feather seal surface is disposed on the ramp.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
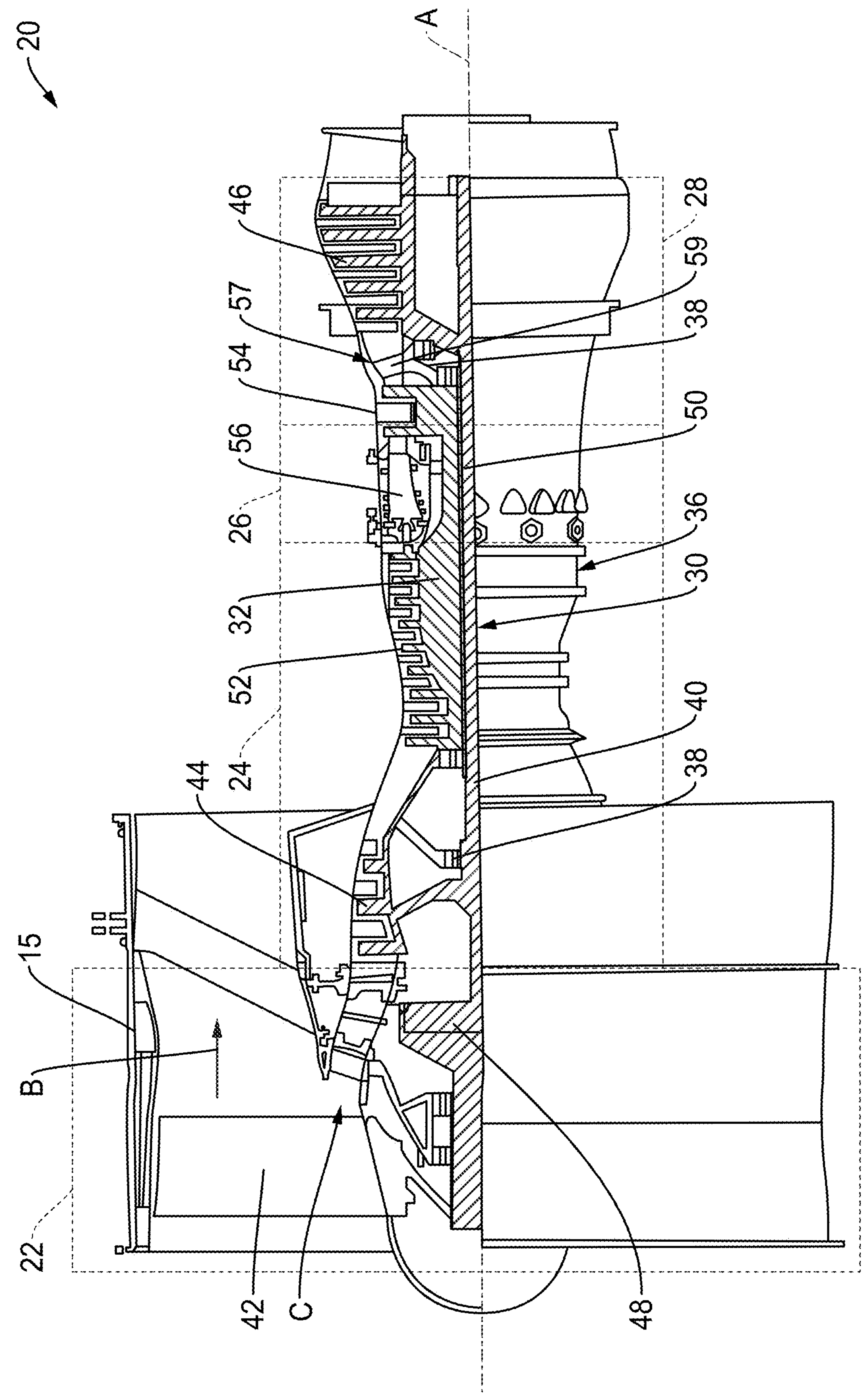
FIG. 1 schematically illustrates a partial cross section of an exemplary gas turbine engine.

The embodiments of the present disclosure can comprise, consist of, and consist essentially of the features and/or steps described herein, as well as any of the additional or optional ingredients, components, steps, or limitations described herein or would otherwise be appreciated by one of skill in the art.

The following discussion omits or only briefly describes conventional features of the disclosed technology that are apparent to those skilled in the art. Reference to a particular embodiment does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms "a," "an," and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

The devices of the present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. All spatial references, such as, for example, proximal, distal, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior."

It will further be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

Various examples of the disclosed technology are provided throughout this disclosure. The use of these examples is illustrative only, and in no way limits the scope and meaning of the invention or of any exemplified form. Likewise, the invention is not limited to any particular preferred embodiment(s) described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

The present disclosure is directed to various CMC BOAS segment geometries for creating sealing configurations for CMC BOAS intersegment feather seals that do not rely on machining slots into the circumferential end face, thus a cold overhang may be avoided. Embodiments of the present disclosure use feather seals sitting atop the non-flowpath side of the CMC BOAS shoe as the sealing surface and utilize various methods of retaining the feather seals to prevent disengagement from the CMC BOAS segments.

In the discussion below, axial refers to a direction that coincides with the longitudinal axis of the engine. Radial refers to a direction that is radial with respect to the longitudinal axis of the engine. Circumferential refers to a direction that corresponds to the circumference of a circle around the longitudinal axis of the engine. The leading edge/portion of a structure is the edge/portion that faces into the flow of the hot gases, i.e., faces upstream. The trailing edge/portion of a structure is the edge/portion that the faces away from the flow of the hot gases, i.e., faces downstream. On a CMC BOAS segment, a gaspath or flowpath side faces the flow of hot gases and the non-gaspath or non-flowpath side faces away from the flow of hot gases.

FIG. 1 schematically illustrates an example of a gas turbine engine 20 (i.e., a two-spool turbofan) which includes a fan section 22, a compressor section 24, a combustor section 26, and a turbine section 28. Fan section 22 drives air along a bypass flow path B in a bypass duct defined within a housing 15, and also along a core flow path C for compression in compressor section 24, with subsequent introduction into combustor section 26, followed by expansion through turbine section 28. Although FIG. 1 depicts a two-spool turbofan gas turbine engine, it should be understood that the concepts described herein are not limited to use with two-spool turbofans engines and may be applied to other types of turbine engines.

Engine 20 generally includes a low speed spool 30 and a high-speed spool 32 mounted for rotation about an engine central longitudinal axis A, relative to an engine static structure 36, via several bearing systems 38. Various bearing systems 38 at various locations may alternatively or additionally be provided. The location of bearing systems 38 may be varied as appropriate to the application.

The low speed spool 30 generally includes an inner shaft 40 that interconnects, a first (or low) pressure compressor 44 and a first (or low) pressure turbine 46. Inner shaft 40 is connected to fan 42 through a speed change mechanism, which in this exemplary embodiment is illustrated as a geared structure 48 to drive fan 42 at a lower speed than the low speed spool 30. High speed spool 32 includes an outer shaft 50 that interconnects a second (or high) pressure compressor 52 and a second (or high) pressure turbine 54. Combustor 56 is positioned between high pressure compressor 52 and high-pressure turbine 54. A mid-turbine frame 57 of the engine static structure 36 may be arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core air flow is first compressed by low pressure compressor 44, and then by the high-pressure compressor 52. Thereafter, the core air flow is mixed and burned with fuel in combustor 56, then expanded in high pressure turbine 54 and low-pressure turbine 46. The mid-turbine frame 57 includes airfoils 59 which are in the core airflow path C. The turbines 46 and 54 rotationally drive the respective low speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low-pressure compressor, or aft of the combustor section 26 or even aft of turbine section 28, and fan 42 may be positioned forward or aft of the location of gear system 48.

The turbine section 28 includes at least one rotor and at least one blade extending radially outwardly from the rotor. The turbine section 28 may further include a blade outer air seal(s) (BOAS(s)). The blade outer air seal can be an assembly of a plurality of BOAS segments that together form an annular shaped shroud around the engine's central longitudinal axis A which is positioned between an outer casing of the engine and the turbine blade(s) of the turbine section.

Figure 2:
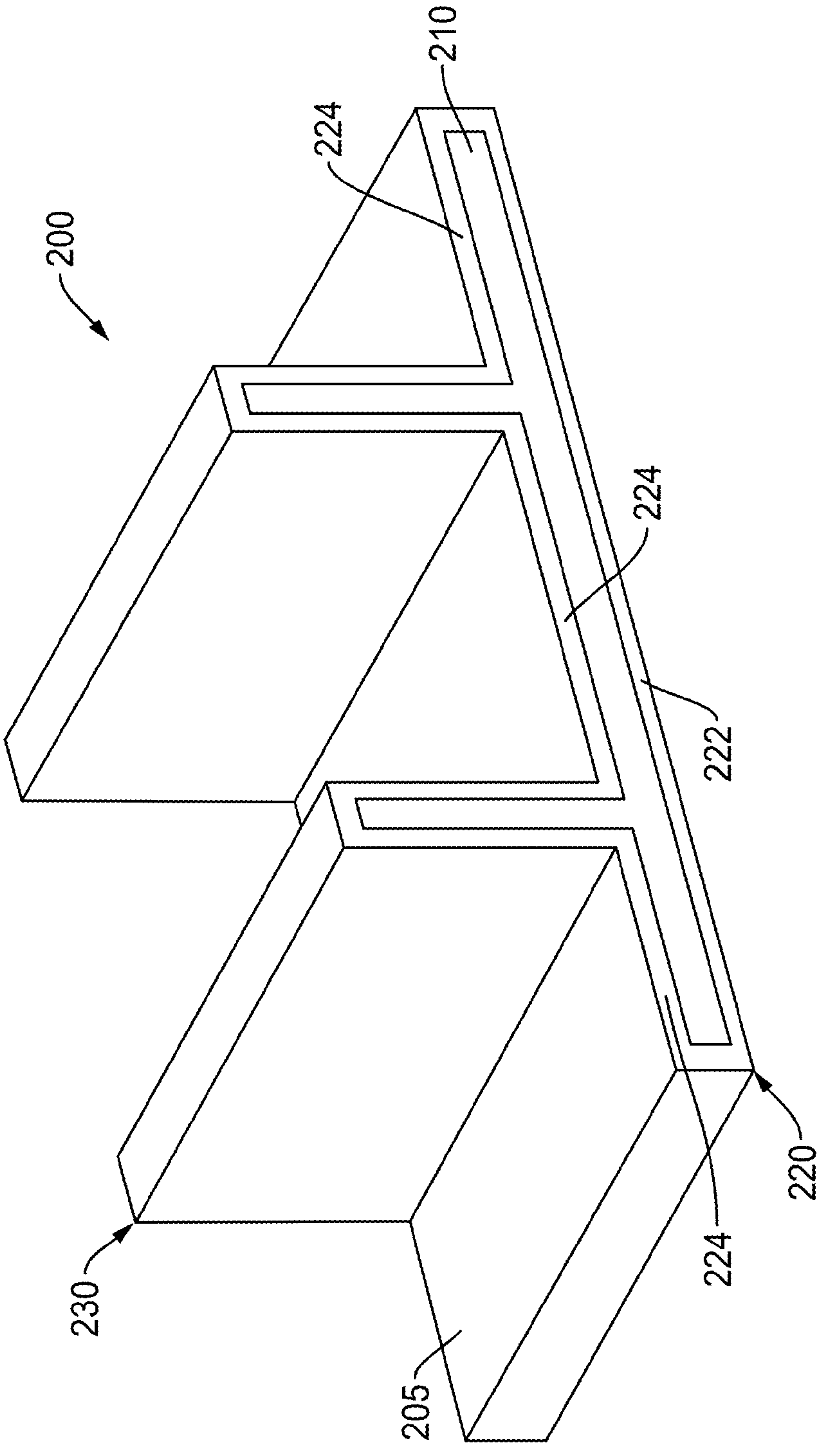
FIG. 2 schematically illustrates a traditional feather seal arrangement.

With reference to FIG. 2, a ceramic matrix composite (CMC) blade outer air seal (BOAS) of a turbine engine may be formed from multiple segments 200, and a feather seal may be used to seal adjacent CMC BOAS segments 200. However, as illustrated in FIG. 2, traditional feather seal slots 210 machined into the circumferential end faces or matefaces 220 of CMC BOAS segments 200 can create high tensile thermal stresses. The horizontal portion of slot 210 in the mateface 220 effectively creates a thin hot wall 222 inboard of the slot 210 and a thin cool wall 224 outboard of the slot 210 on the non-flowpath side 205. This creates a cold overhang at cool wall 224 that drives a significant tensile thermal stress in the CMC BOAS segment 200. Terminating the slot 210 at the base of the flange 230 can lead to stress concentrations, which can exacerbate attachment stresses.

Figure 3:
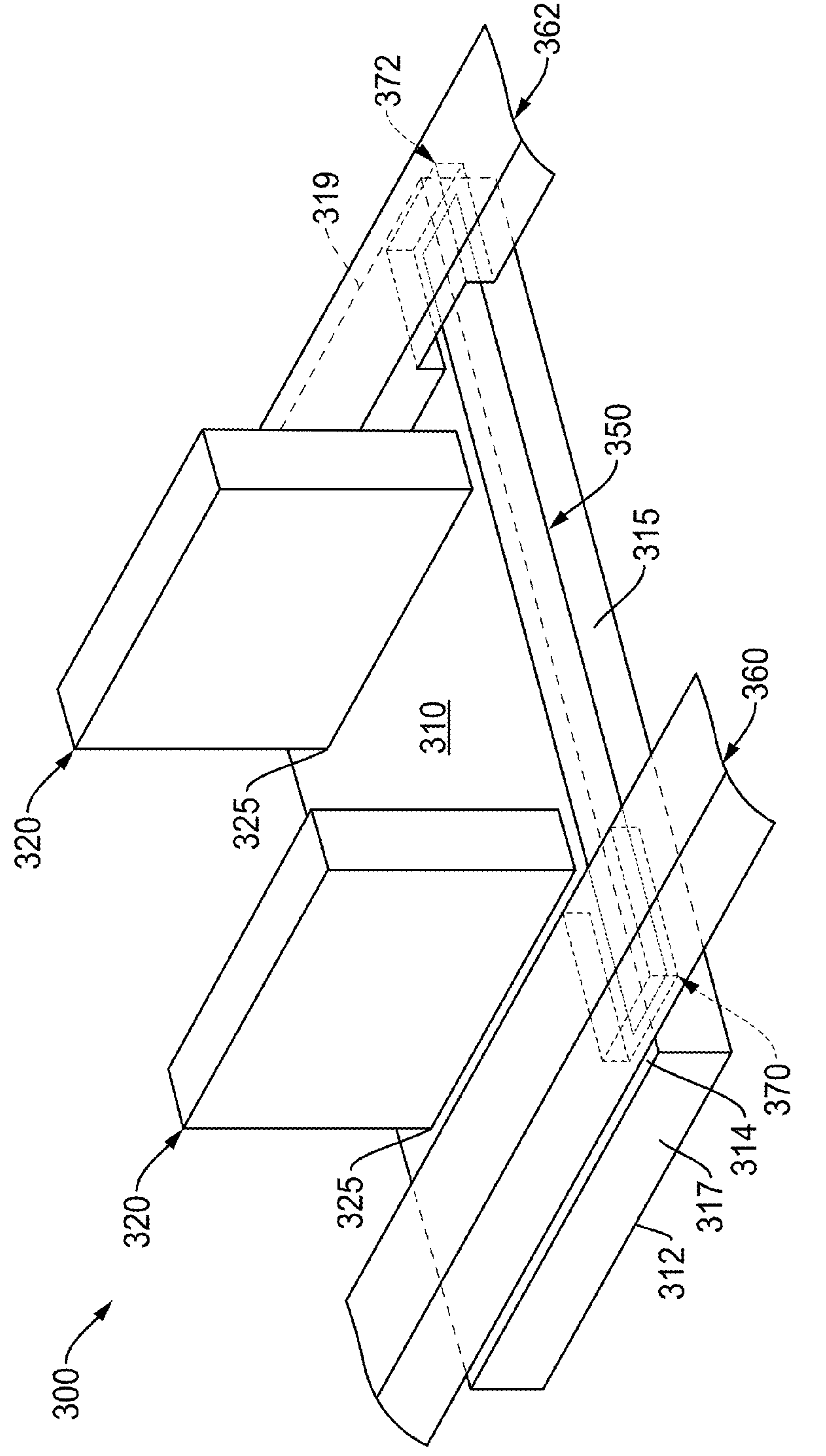
FIG. 3 schematically illustrates an example embodiment of a feather seal arrangement with set back support flanges in accordance with the present disclosure.

With reference to FIG. 3, an embodiment of feather seal arrangement for a ceramic matrix composite (CMC) blade outer air seal (BOAS) of a turbine engine in accordance with the present disclosure may eliminate the cold overhang causing the thermal stress.

In this example feather seal arrangement, a CMC BOAS segment 300 includes a shoe 310 having a flowpath side 312 configured for exposure to a hot gas path of the turbine engine. The shoe 310 also has an opposing non-flowpath side 314, and first and second (not shown) matefaces 315 extending axially between the flowpath side 312 and the non-flowpath side 314 from an upstream leading edge 317 to a downstream trailing edge 319.

The CMC BOAS segment 300 in this example feather seal arrangement also includes one or more support flanges 320 extending substantially transverse from the non-flowpath side 314 of shoe 310. In the illustrated embodiment, the CMC BOAS segment 300 includes two support flanges 320, but embodiments are not limited thereto and may, for example, have one or three support flanges. In one or more embodiments, the one or more flanges 320 may extend in a direction transverse and extending substantially between the first and second matefaces 315.

In this embodiment, the support flanges 320 are set back from the matefaces 315 at locations 325 to allow room for a substantially flat feather seal surface atop (i.e., disposed on) the non-flowpath side 314 adjacent and substantially transverse to the matefaces 315. Accordingly, a feather seal 350 may be disposed atop the non-flowpath side 314 on the feather seal surface and extend to an adjacent feather seal surface of an adjacent CMC BOAS segment (not shown) to form a seal therebetween.

In accordance with the present disclosure, a feather seal 350 may be formed in a simple manner from a flat piece of high temperature alloy, such as HAYNES® 188 (UNS R30188) cobalt alloy.

As further illustrated in FIG. 3, the feather seal arrangement may also include hardware to support the feather seal 350 in position on CMC BOAS segment 300. In the illustrated embodiment, a first full hoop or split ring retainer 360 may be configured for retaining an upstream end of the feather seal 350 and a second full hoop or split ring retainer 362 may be configured for retaining a downstream end of the feather seal 350.

In order to retain the feather seal 350 in position atop non-flowpath side 314, the first and/or second full hoop or slit ring retainer 360, 362 may include respective recesses 370 and 372 that are configured to hold the upstream and/or downstream end of the feather seal 350, respectively. Although illustrated with recesses 370 and 372 for holding a single feather seal 350 in position on a single side of a CMC BOAS segment 300, retainers 360 and 362 will typically include recesses for a plurality of feather seals disposed to seal a plurality of CMC BOAS segments making up the CMC BOAS of the turbine engine.

Additionally, while both an upstream retainer 360 and a downstream retainer 362 are illustrated, in certain embodiments one end of the feather seal 350 may be retained by a recess or other structure built into the shoe 310 of the CMC BOAS so that only a single full hoop or slit ring retainer 360 or 362 may be used to hold the feather seal 350 in position.

The set back support flanges 320 in the embodiment of FIG. 3 allows placement of feather seal 350 atop the non-flowpath side 314 so as to eliminate the thin, cold overhang of the prior art and the resulting thermal stresses. Such an arrangement also permits air flow around the support flanges 320 to permit a single pressure chamber on the outboard side of the CMC BOAS segment 300.

Figure 4:
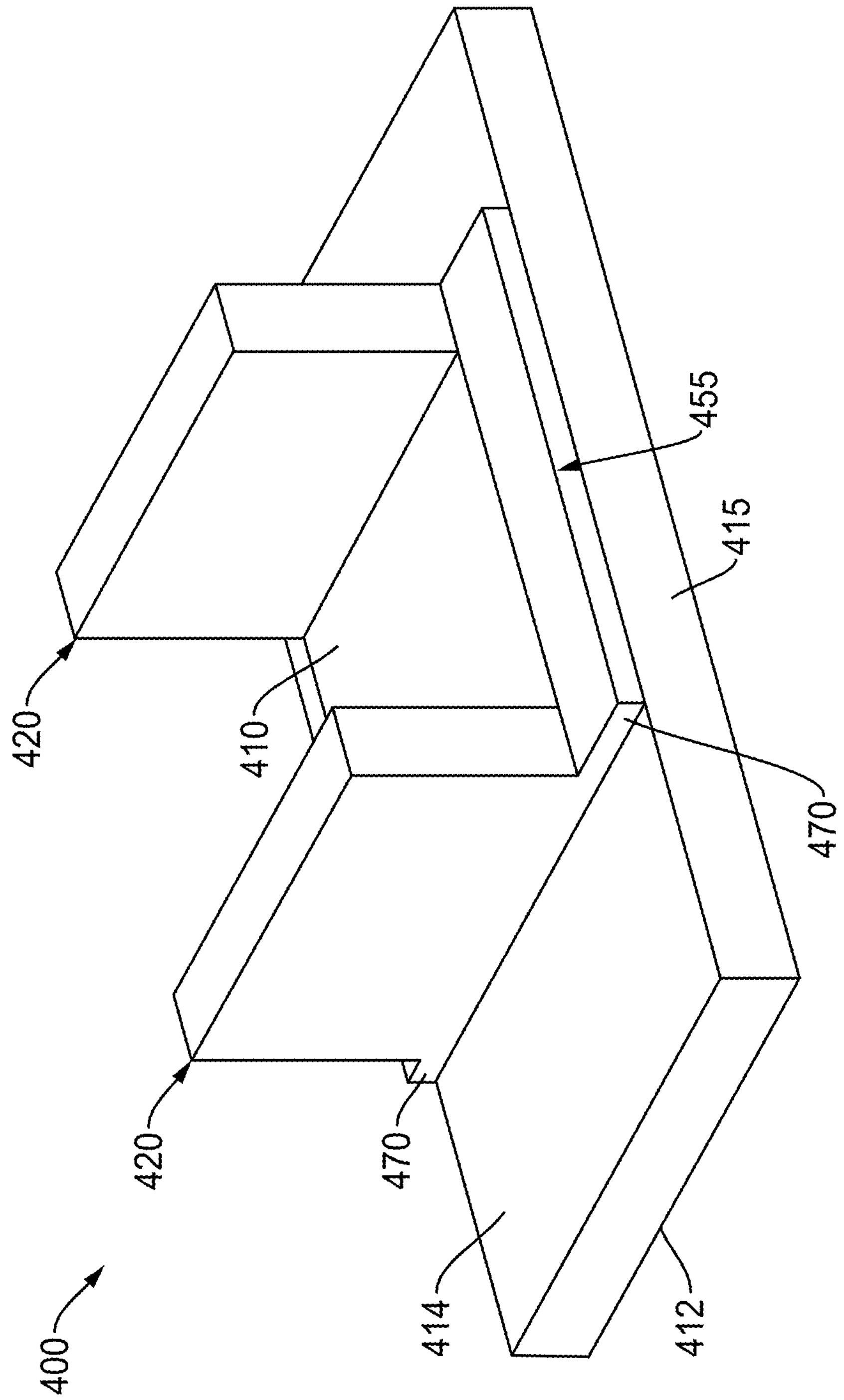
FIG. 4 schematically illustrates an example embodiment of a feather seal arrangement with set back flanges and a plateau in accordance with the present disclosure.

Another example CMC BOAS segment 400 for a further embodiment of a feather seal arrangement in accordance with the present disclosure is illustrated schematically in FIG. 4.

In this embodiment, the CMC BOAS segment 400 includes two flanges 420 that are set back from the mateface (s) 415 that extends between flowpath side 412 and non-flowpath side 414. A raised portion or plateau 470 extends from the non-flowpath side 414 between the two flanges 420, and the substantially flat feather seal surface 455 is disposed on (i.e., atop) the plateau 470. A second plateau 470 may be disposed adjacent the other mateface 415 (not shown) at the other end of the support flanges 420 to provide a second feather seal surface for another feather seal to seal the other side of CMC BOAS segment 400.

The use of plateau 470 in the embodiment of FIG. 4 allows sealing interfaces at the leading edge and trailing edge at radial distances that are different from the surface of non-flowpath side 414 of shoe 410, and also helps avoid stress concentration at the fillet or base of the support flanges 420.

Figure 5:
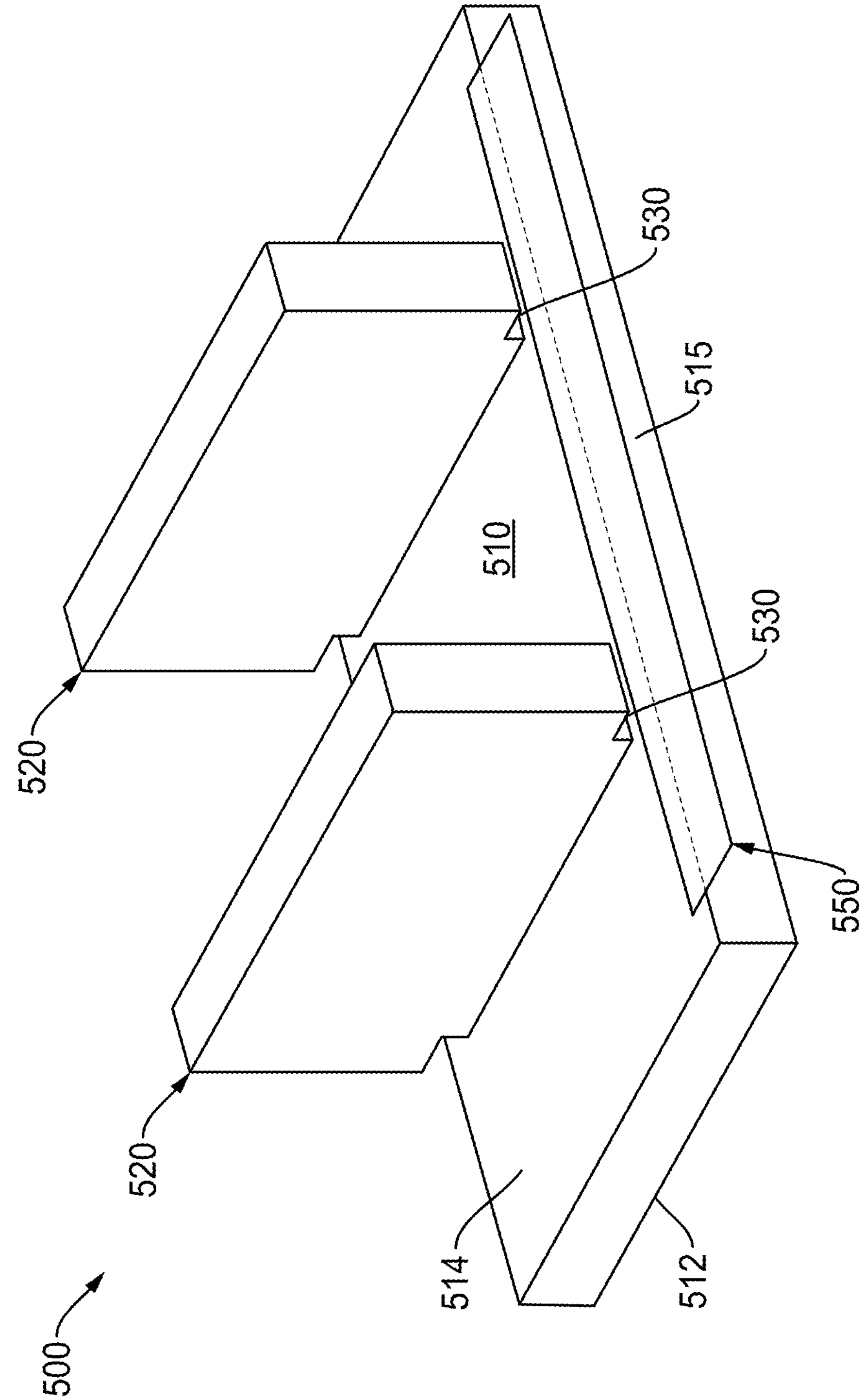
FIG. 5 schematically illustrates an example embodiment of a feather seal arrangement with undercut support flanges in accordance with the present disclosure.

An example CMC BOAS segment 500 for yet another feather seal arrangement in accordance with the present disclosure is illustrated schematically in FIG. 5.

In this embodiment, the CMC BOAS segment 500 includes a leading edge 510 and two flanges 520 that have undercut regions 530 at their bases in order to be set back from the mateface(s) 515 and provide a flat feather seal surface atop non-flowpath side 514 for feather seal 550. The undercut regions 530 may also be dimensioned to assist in retention of the feather seal 550 and/or provide sealing features to provide for separate pressure cavities on opposite sides of the support flanges 520.

A second set of undercut regions 530 may be disposed adjacent the other mateface 415 (not shown) at the bases of the other end of the support flanges 520 to provide a second feather seal surface for another feather seal to seal the other side of CMC BOAS segment 500.

Since the support flanges 520 extend fully across the shoe 510 except for the undercut regions 530 where the feather seal 550 is located, a full circumferential flange may be provided when the segments of the CMC BOAS are assembled, which may provide strength and/or permit air chambers having different pressures on different sides of the support flanges 530.

Figure 6:
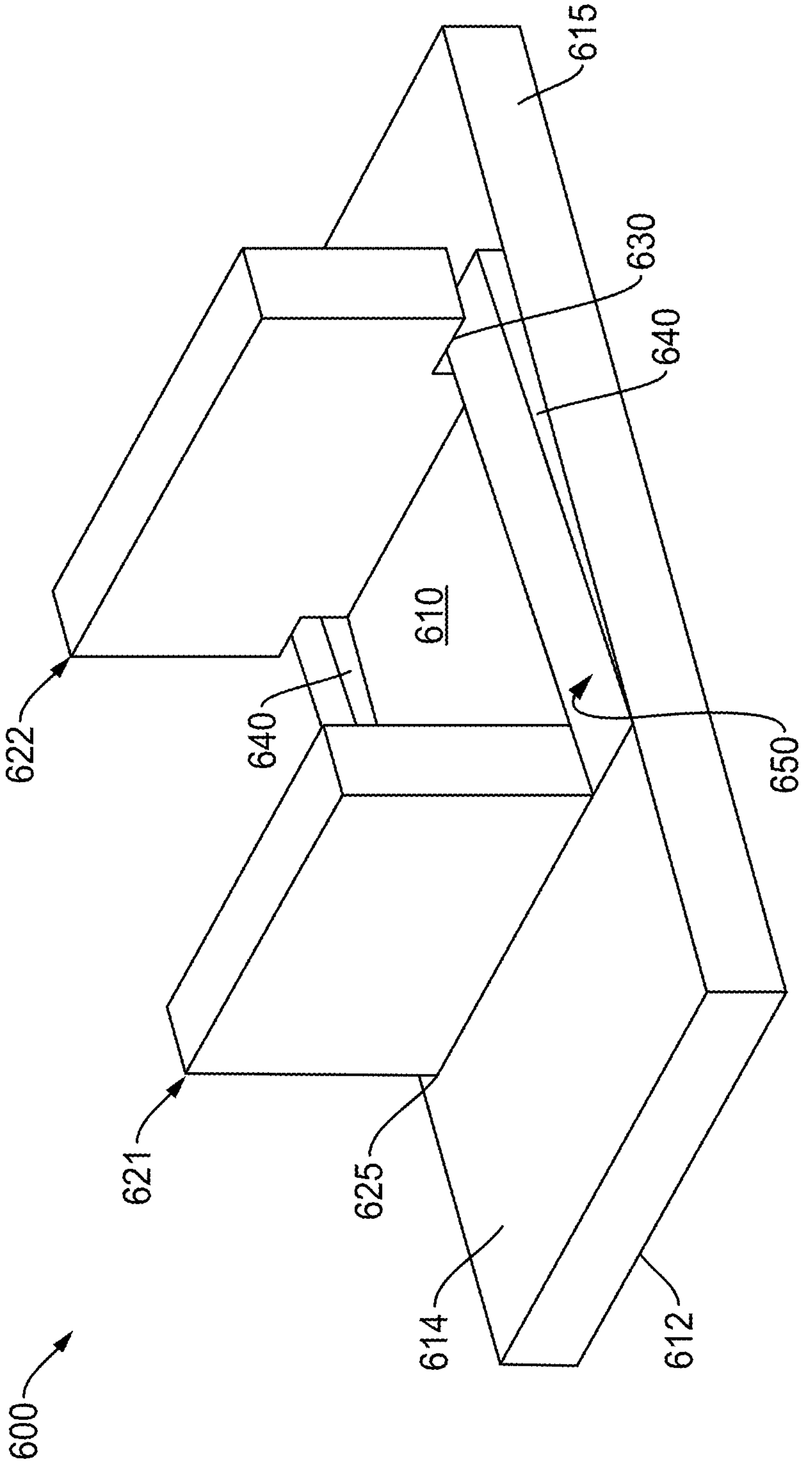
FIG. 6 schematically illustrates an example embodiment of a feather seal arrangement with a set back support flange and a ramp leading to an undercut support flange in accordance with the present disclosure.

An example CMC BOAS segment 600 for a further feather seal arrangement in accordance with the present disclosure is illustrated schematically in FIG. 6.

In this embodiment, the CMC BOAS segment 600 includes a first flange 621 extending from shoe 610 that is set back by a distance 625 from the mateface 615, and a second flange 622 extending from shoe 610 having an undercut portion 630 adjacent the mateface 615. In this embodiment, a ramp 640 begins at the level of non-flowpath side 614 of shoe 610 at the base of a set back end of support flange 621 nearest to leading edge 612, extends between the first flange 621 and the second flange 622, and rises above the non-flowpath side 614 to the undercut portion 630 of the second support flange 622. In this embodiment, the feather seal surface 655 is disposed on the ramp 640.

An opposite end of support flange 621 may also be set back, an opposite end of support flange 622 may be include an undercut portion 630, and a ramp 640 may be provided therebetween to provide another feather seal surface 650 such that another feather seal may seal the other side of CMC BOAS segment 600. In use, the set back distance 625 of support flange 621 may allow air leakage to extend a pressure cavity and the undercut portions 630 of support flange 622 may provide a sealing feature to provide a separate pressure cavity on the non-flowpath side 614 of the CMC BOAS segment 600.

In this embodiment of FIG. 6, the elevated portion of ramp 640 near the trailing edge of CMC BOAS segment 600 enables an exit for the feather seal 650 that is not coincident with a stress concentration feature (flange fillet of support flange 622). It also enables sealing of the leading edge and trailing edge of feather seal 650 at differing radial distances. Additionally, the undercut portion 630 of support flange 622 may act as a thermal break so it moves the thermal gradient outboard and away from the gaspath.

Figure 7:
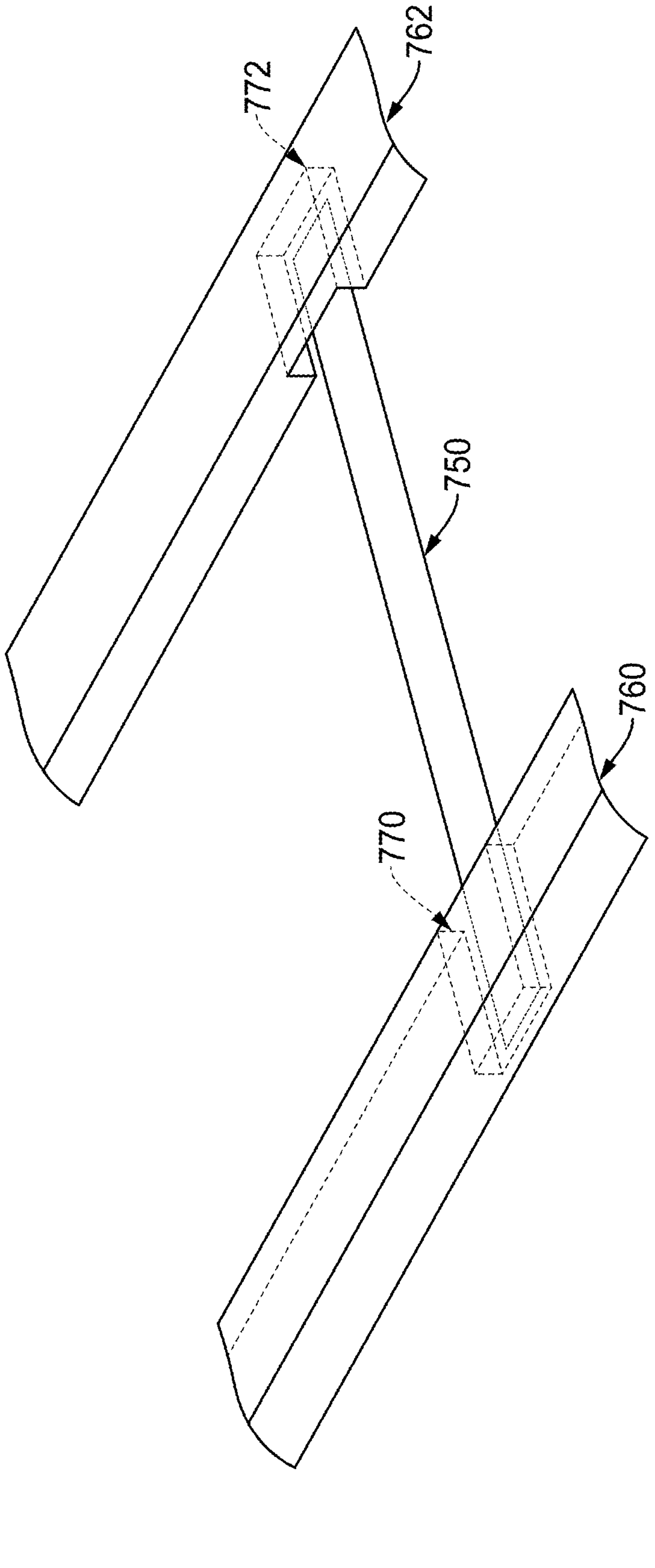
FIG. 7 schematically illustrates an example embodiment of retainers usable with a feather seal in accordance with the present disclosure.

Although FIGS. 4, 5, and 6 do not illustrate any seal retention hardware or features, as in FIG. 3, these embodiments may also include retention features in the form of a full hoop or split ring as illustrated in FIG. 7.

In FIG. 7, a first full hoop or split ring retainer 760 may be configured for retaining an upstream end of a feather seal 750 and a second full hoop or split ring retainer 762 may be configured for retaining a downstream end of the feather seal 750.

In order to retain the feather seal 750 in position, the first and second full hoop or slit ring retainer 760 and 762 may include respective recesses 770 and 772 that are configured to hold the upstream and/or downstream end of the feather seal 750, respectively. Although illustrated with recesses 770 and 772 for holding a single feather seal 750 in position on (e.g., a single side of a CMC BOAS segment), retainers 760 and 762 will typically include a plurality of recesses for a plurality of feather seals disposed to seal a plurality of CMC BOAS segments making up the CMC BOAS of the turbine engine.

Although FIG. 7 discloses a feather seal retention mechanism suitable for the present disclosure, embodiments are not limited thereto. For example, when CMC BOAS segments use cavity cover plates, retention mechanisms of the cover plates disposed on the non-flowpath side of the segment, such as springs or clips, or the cover plates themselves, such as with tab extensions, may be adapted to further retain the feather seal that is similarly disposed on the non-flowpath side of the segment.

Figure 8:
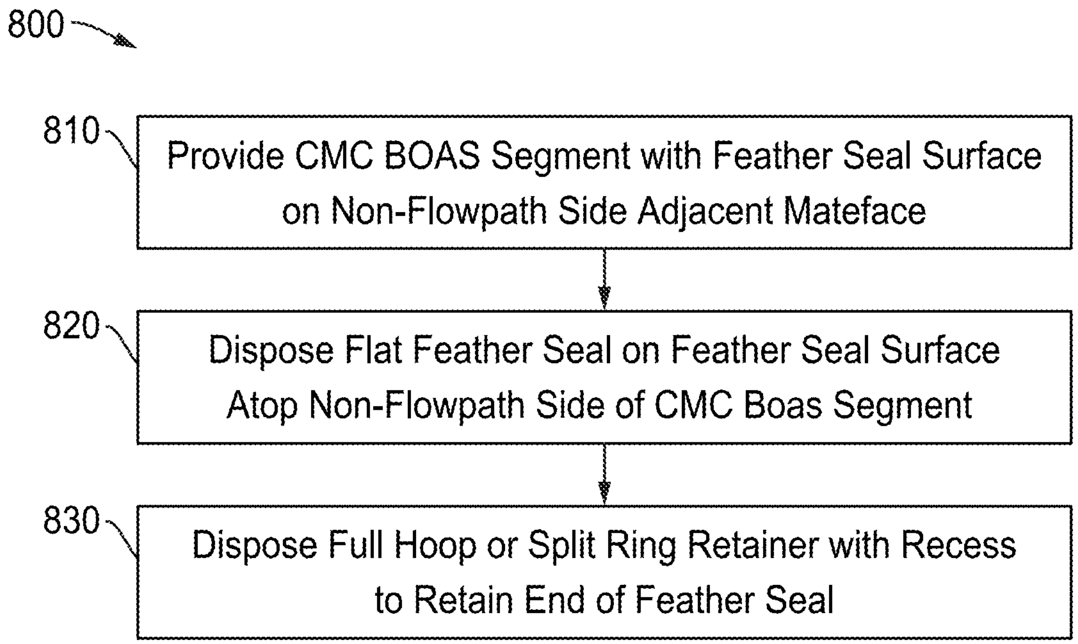
FIG. 8 is a flow diagram of an example process in accordance with the present disclosure.

In one or more embodiments, the present disclosure may include a feather seal method 800 for a CMC BOAS of a turbine engine, as illustrated in the flow chart of FIG. 8.

In a first step 810, method 800 includes providing a CMC BOAS segment with a feather seal surface on a non-flowpath side thereof adjacent to a mateface of the CMC BOAS segment. In an embodiment, this includes providing a CMC BOAS segment with a shoe having a flowpath side configured for exposure to a hot gas path of the turbine engine, an opposing non-flowpath side, and first and second matefaces extending axially between the flowpath side and the non-flowpath side from an upstream leading edge to a downstream trailing edge. This step 810 may also include providing one or more support flanges extending substantially transverse from the non-flowpath side, and providing a substantially flat first feather seal surface disposed on the non-flowpath side adjacent and substantially transverse to the first mateface.

In a next step 820, method 800 includes disposing a first feather seal atop the non-flowpath side on the first feather seal surface. In various embodiments, this includes extending the feather seal to an adjacent feather seal surface of an adjacent CMC BOAS segment.

In a final step 830, method 800 includes disposing a first full hoop or split ring retainer to retain an end of the feather seal. In various embodiments, this includes disposing a first full hoop or split ring retainer to retain an upstream end of the first feather seal and a second full hoop or split ring retainer to retain a downstream end of the first feather seal. Various other embodiments of method 800 may include holding the upstream and/or downstream end of the first feather seal in a recess of the first and/or second full hoop or slit ring retainer, respectively.

Method 800 may employ various geometries of CMC BOAS segments. In an embodiment, method 800 may include disposing the one or more flanges to extend between the first and second matefaces. A further embodiment may include setting at least one of the one or more flanges back from the first mateface to provide the first feather seal surface. Another embodiment may include undercutting a portion of at least one of the one or more flanges to provide the first feather seal surface.

In yet another embodiment, method 800 may include providing the one or more flanges by providing two flanges that are setback from the first mateface, and further providing a plateau that extends from the non-flowpath side between the two flanges, and disposing the first feather seal on the plateau. In a further embodiment, providing the one or more flanges may include providing two flanges including a first flange set back from the first mateface, and a second flange having an undercut portion adjacent the first mateface, and optionally providing a ramp that extends between the first flange and the second flange, wherein the first feather seal surface may be disposed on the ramp.

Embodiments in accordance with the present disclosure improve the stress state of CMC BOAS segments by reducing the thermally induced stress driven by cold overhangs created by traditional circumferential end face feather seal slots. In the configurations of the present disclosure, the feather seal sits atop the non-flowpath side of the CMC BOAS segment, thus the full shoe thickness is inboard of the sealing surface and no cold overhang is created. Furthermore, in embodiments where the feather seal machined features (i.e., slot) do not intersect the CMC BOAS flange fillet can avoid introducing a stress concentration feature at an attachment feature that can be highly stressed. It is noteworthy that thermal introduced strain at this slot location can sometimes drive the slot into compression thus enabling other slot configurations shown in this disclosure to still be viable. However, for thermal situations where this compression is not present, the configurations with elevated feather seal slots can provide additional structural benefit.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A feather seal arrangement for a ceramic matrix composite (CMC) blade outer air seal (BOAS) of a turbine engine, comprising:

a CMC BOAS segment including:

a shoe having a flowpath side configured for exposure to a hot gas path of the turbine engine, an opposing non-flowpath side, and first and second matefaces extending axially between the flowpath side and the non-flowpath side from an upstream leading edge to a downstream trailing edge;

one or more support flanges extending substantially transverse from the non-flowpath side; and a substantially flat first feather seal surface disposed on the non-flowpath side adjacent and substantially transverse to the first mateface;

a first feather seal disposed atop the non-flowpath side on the first feather seal surface and extending to an adjacent feather seal surface of an adjacent CMC BOAS segment; and a first full hoop retainer configured for retaining an upstream end of the first feather seal and/or a second full hoop retainer configured for retaining a downstream end of the first feather seal, wherein the first and/or second full hoop retainer comprises an axial recess configured to axially hold the upstream and/or downstream end of the first feather seal, respectively.

2. The feather seal arrangement of claim 1, wherein the one or more flanges extend between the first and second matefaces.

3. The feather seal arrangement of claim 2, wherein at least one of the one or more flanges are set back from the first mateface to provide the first feather seal surface.

4. The feather seal arrangement of claim 2, wherein at least one of the one or more flanges includes an undercut portion to provide the first feather seal surface.

5. The feather seal arrangement of claim 2, wherein the one or more flanges comprise two flanges that are set back from the first mateface, a plateau extends from the non-flowpath side between the two flanges, and the first feather seal is disposed on the plateau.

6. The feather seal arrangement of claim 2, wherein the one or more flanges comprise two flanges that include a first flange set back from the first mateface, and a second flange having an undercut portion adjacent the first mateface.

7. The feather seal arrangement of claim 6, further comprising a ramp that extends between the first flange and the second flange, and the first feather seal surface is disposed on the ramp.

8. A feather seal method for a ceramic matrix composite (CMC) blade outer air seal (BOAS) of a turbine engine, comprising:

providing a CMC BOAS segment including:

a shoe having a flowpath side configured for exposure to a hot gas path of the turbine engine, an opposing non-flowpath side, and first and second matefaces extending axially between the flowpath side and the non-flowpath side from an upstream leading edge to a downstream trailing edge;

one or more support flanges extending substantially transverse from the non-flowpath side; and a substantially flat first feather seal surface disposed on the non-flowpath side adjacent and substantially transverse to the first mateface;

disposing a first feather seal atop the non-flowpath side on the first feather seal surface and extending the feather seal to an adjacent feather seal surface of an adjacent CMC BOAS segment;

disposing a first full hoop retainer to retain an upstream end of the first feather seal and/or a second full hoop retainer to retain a downstream end of the first feather seal; and axially holding the upstream and/or downstream end of the first feather seal in an axial recess of the first and/or second full hoop retainer, respectively.

9. The feather seal method of claim 8, further comprising disposing the one or more flanges to extend between the first and second matefaces.

10. The feather seal method of claim 9, further comprising setting at least one of the one or more flanges back from the first mateface to provide the first feather seal surface.

11. The feather seal method of claim 9, further comprising undercutting a portion of at least one of the one or more flanges to provide the first feather seal surface.

12. The feather seal method of claim 9, wherein providing the one or more flanges comprises providing two flanges that are setback from the first mateface, and further providing a plateau that extends from the non-flowpath side between the two flanges, and disposing the first feather seal on the plateau.

13. The feather seal method of claim 9, wherein providing the one or more flanges comprises providing two flanges including a first flange set back from the first mateface, and a second flange having an undercut portion adjacent the first mateface.

14. The feather seal method of claim 13, further comprising providing a ramp that extends between the first flange and the second flange, and disposing the first feather seal surface on the ramp.

* * * * *